United States Patent [19]

Matsuzawa et al.

[11] Patent Number: 5,390,062
[45] Date of Patent: Feb. 14, 1995

[54] THIN-FILM MAGNETIC CIRCUIT BOARD AND MAGNETIC HEAD USING THE SAME

[75] Inventors: Soichiro Matsuzawa, Kuwana; Yayo Akai, Nagoya; Nobuhiro Terada, Kasugai, all of Japan

[73] Assignee: NGK Insulators, Ltd., Japan

[21] Appl. No.: 212,398

[22] Filed: Mar. 14, 1994

Related U.S. Application Data

[63] Continuation of Ser. No. 884,014, May 18, 1992, abandoned.

[30] Foreign Application Priority Data

May 21, 1991 [JP] Japan .................. 3-146917

[51] Int. Cl.$^6$ .................. G11B 5/147; G11B 5/127
[52] U.S. Cl. .................. 360/126; 360/125
[58] Field of Search .............. 360/126, 123, 125, 113, 360/110, 121

[56] References Cited

U.S. PATENT DOCUMENTS

| | | | |
|---|---|---|---|
| 4,404,609 | 9/1983 | Jones, Jr. | 360/126 |
| 4,626,947 | 12/1986 | Narishige et al. | 360/126 |
| 4,814,921 | 3/1989 | Hamakawa et al. | 360/126 |
| 4,943,883 | 7/1990 | Sano et al. | 360/126 |
| 5,031,063 | 7/1991 | Hasegawa | 360/126 |
| 5,124,870 | 6/1992 | Toyoda | 360/126 |
| 5,136,447 | 8/1992 | Makino et al. | 360/126 |
| 5,195,004 | 3/1993 | Okuda et al. | 360/126 |

FOREIGN PATENT DOCUMENTS

| | | | |
|---|---|---|---|
| 20912 | 2/1982 | Japan | 360/126 |
| 57-20912 | 3/1982 | Japan | 360/126 |
| 23411 | 1/1989 | Japan | 360/113 |
| 3-225610 | 4/1991 | Japan | 360/123 |
| 3225610 | 10/1991 | Japan | 360/126 |

OTHER PUBLICATIONS

IBM technical disclosure Bulletin (vol. 23, No. 10 Mar. 1981).

Primary Examiner—John H. Wolff
Assistant Examiner—Allen Cao
Attorney, Agent, or Firm—Parkhurst, Wendel & Rossi

[57] ABSTRACT

A thin-film magnetic circuit board is disclosed which includes: a first and a second substrate formed of a magnetic material; a non-magnetic layer for bonding these substrates to each other; at least one coil formed from an electrically conductive film to provide a circuit pattern, each coil having a spiral shape and surrounding a predetermined blank portion of at least one of the first and second substrates; a pair of leads which are electrically connected to opposite ends of the circuit pattern formed by the coil(s); and a connector formed from a magnetic film, for magnetically connecting the first and second substrates. The connector is fixed to the predetermined blank portion of the first and/or second substrates. Also is disclosed a magnetic head including this thin-film magnetic circuit board.

10 Claims, 12 Drawing Sheets

THIN-FILM MAGNETIC CIRCUIT BOARD AND MAGNETIC HEAD USING THE SAME

This is a continuation division of application Ser. No. 07/884,014 filed May 18, 1992, now abandoned.

BACKGROUND OF THE INVENTION

1. Field of the Invention

The present invention relates to a thin-film magnetic circuit board, and to a magnetic head using such a circuit board. In particular, the invention is concerned with a magnetic head using a novel type of thin-film magnetic circuit board, which magnetic head can be manufactured with high efficiency, assuring relatively small magnetic resistance and improved operating efficiency.

2. Discussion of the Prior Art

As a type of magnetic heads used with a floppy disk drive (FDD), hard disk drive (HDD) or other devices, there is known a so-called bulk-type magnetic head which includes a generally ring-shaped magnetic head core formed of a magnetic material such as ferrite, and a coil attached to the head core. An example of the bulk-type magnetic head is shown in FIG. 23, in which a pair of generally C-shaped core halves 2, 2 are butted and bonded together, to thereby provide a magnetic head core 6 having an annular magnetic path (magnetic circuit) and a magnetic gap 4 formed at a point of the circumference thereof so as to extend in a direction perpendicular to the magnetic path. The magnetic head core 6 has a central aperture 8 which is utilized for winding a coil 10 on the head core 6.

To produce this bulk-type magnetic head, however, the coil 10 must be wound through a considerably small aperture 8 formed through the magnetic head core 6. This coil-winding procedure is usually manually effected, and therefore accounts for about 20% of the whole cost of manufacturing the magnetic head. Thus, the above type of magnetic head is manufactured with low efficiency at an undesirably increased cost.

In recent years, there is proposed a so-called thin-film type magnetic head which employs a magnetic film or films and an electrically conductive film formed by a thin-film forming method such as photoetching, to provide a magnetic circuit and a coil, respectively. An example of such a magnetic head is illustrated in FIG. 24, which is constructed such that a lower magnetic layer 14, a coil 16 and an upper magnetic layer 18 are superposed on a non-magnetic substrate 12 in the order of description, by a suitable thin-film forming method, and such that the lower and upper magnetic layers 14, 18 cooperate with a magnetic gap 20 formed therebetween to constitute a closed magnetic circuit.

While the coil 16 of the above magnetic head may be easily formed by the thin-film forming method, it is extremely difficult to form the upper and lower magnetic layers 18, 14 of the magnetic circuit by the same thin-film forming method so that the layers 18, 14 have a sufficiently large thickness. Consequently, the magnetic head of this type suffers from undesirably increased magnetic resistance in the magnetic circuit, resulting in deteriorated operating efficiency of the head.

Namely, neither of the bulk-type and thin-film type of magnetic heads is able to meet both requirements, i.e., high efficiency in producing the magnetic head and excellent operating characteristics of the head. Thus, the known magnetic heads have some room for improvement in the above respects.

SUMMARY OF THE INVENTION

It is therefore an object of the present invention to provide a novel thin-film magnetic circuit board, and a magnetic head using the circuit board, which head can be produced with high efficiency, and has a relatively small magnetic resistance and improved operating efficiency.

The above object may be attained according to one aspect of the present invention, which provides a thin-film magnetic circuit board comprising: a first and a second substrate formed of a magnetic material; a non-magnetic layer interposed between mutually abutting surfaces of the first and second substrates, for bonding the first and second substrates to each other; at least one coil formed from an electrically conductive film to provide a circuit pattern, each coil having a spiral shape and surrounding a predetermined blank portion of at least one of the first and second substrates; a pair of leads which are electrically connected to opposite ends of the circuit pattern formed by the above-indicated at least one coil; and a connector formed from a magnetic film, for magnetically connecting the first and second substrates, the connector extending between the first and second substrates such that the connector is fixed to the predetermined blank portion of the at least one of the first and second substrates.

The thin-film magnetic circuit board of the invention constructed as described above can be easily manufactured with significantly improved productivity, since a coil is efficiently formed from an electrically conductive thin film. Further, the present magnetic circuit board has a reduced length of magnetic circuit including the first and second substrates formed of a magnetic material, assuring significantly reduced magnetic resistance in the magnetic circuit.

The above object may be also attained according to another aspect of the invention, which provides a magnetic head including the thin-film magnetic circuit board as defined above, wherein a magnetic gap is formed between the mutually abutting surfaces of the first and second substrates, the first and second substrates cooperating with the connector to provide a single closed magnetic circuit including the magnetic gap.

The magnetic head constructed as described above can be produced with high efficiency, and at the same time ensures excellent operating characteristics.

The same object may be attained according to a further aspect of the invention, which provides a magnetic head including the thin-film magnetic circuit board as defined above, and a head core element comprising: a third and a fourth substrate formed of a magnetic material; a non-magnetic layer interposed between mutually abutting surfaces of the third and fourth substrates, for bonding the third and fourth substrates to each other, the non-magnetic layer partially defining a magnetic gap which is formed between the mutually abutting surfaces of the third and fourth substrates; the core element being superposed on one of opposite major surfaces of the thin-film magnetic circuit board on which the connector is not provided, so that the third and fourth substrates are magnetically connected to the first and second substrates, respectively, the first, second, third and fourth substrates cooperating with the connector to provide a single closed magnetic circuit including the magnetic gap.

For producing the magnetic head constructed as described above, the formation of coils by a thin-film forming method may be effected independently of the formation of a magnetic gap by a machining process. Thus, the coils, magnetic gap and others can be easily formed, assuring further improved productivity of the magnetic head.

BRIEF DESCRIPTION OF THE DRAWINGS

The foregoing and other objects, features and advantages of the present invention will become more apparent by reading the following detailed description of a presently preferred embodiment of the invention, when considered in connection with the accompanying drawings, in which.

DETAILED DESCRIPTION OF THE PREFERRED EMBODIMENT

Figure 1:
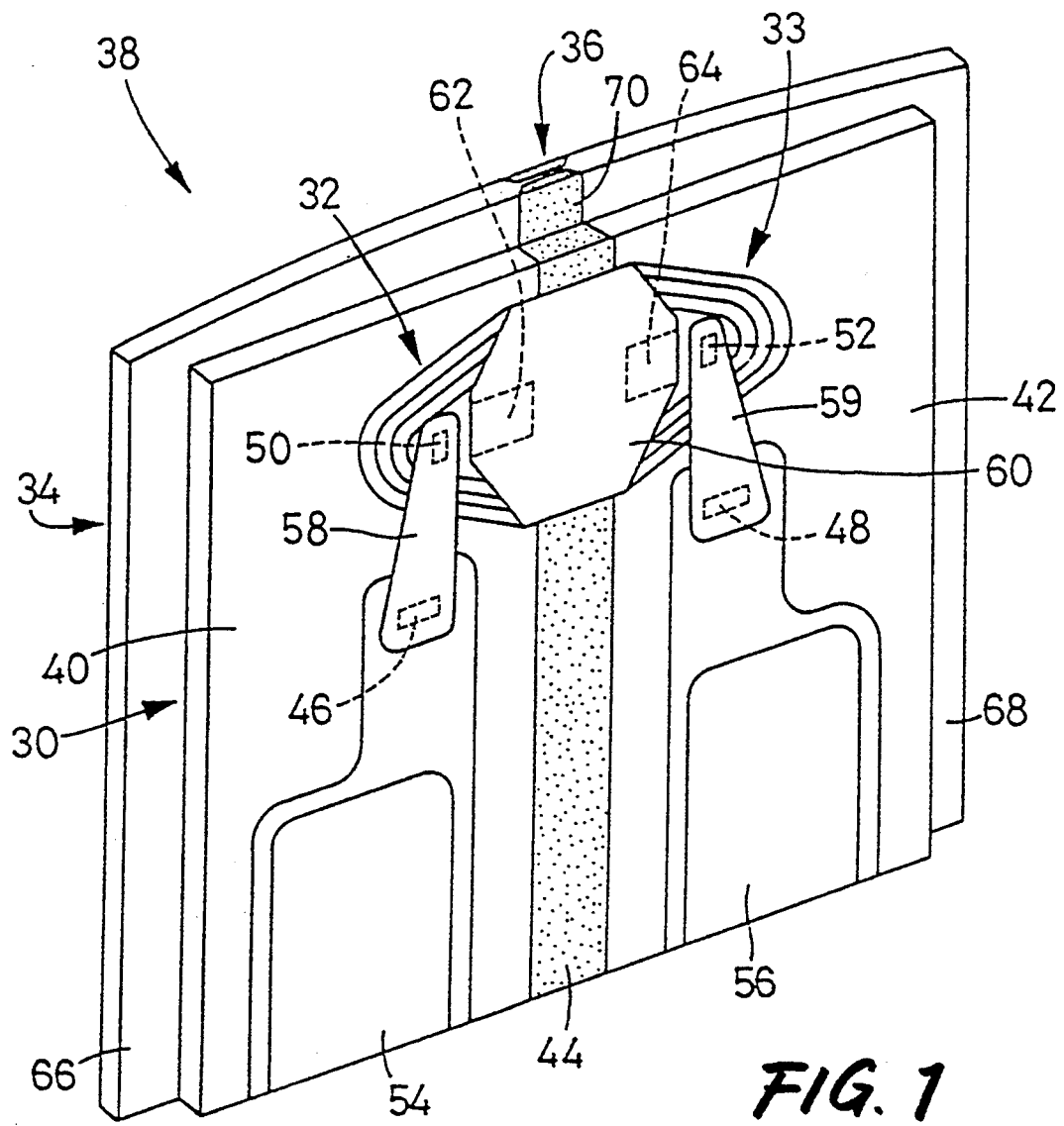
FIG. 1 is a perspective view of one embodiment of a magnetic head of the present invention.

Referring first to FIG. 1, there is illustrated one embodiment of a magnetic head of the present invention, which incorporates a thin-film magnetic circuit board constructed according to the present invention. In FIG. 1, reference numeral 30 denotes a magnetic circuit board having a pair of coils 32, 33, while reference numeral 34 denotes a magnetic head core in the form of a core element having a magnetic gap 36 (which will be described). In the instant embodiment, the magnetic circuit board and core element 30, 34 are butted and bonded together, to thereby provide a magnetic head 38 which has a closed magnetic path including the magnetic gap 36.

More specifically, the magnetic circuit board 30 includes a first and a second substrate formed of a magnetic material, i.e., a first magnetic substrate 40 and a second magnetic substrate 42 both having a generally rectangular planar shape. The first and second magnetic substrates 40, 42 are butted and bonded together through a non-magnetic bonding layer 44 formed of a glass material or the like, into an integral flat plate which gives a body of the magnetic circuit board 30. These first and second magnetic substrates 40, 42 are favorably formed of a ferrite material or alloy used for conventional head cores and having a high degree of magnetic permeability. Preferably, the magnetic substrates 40, 42 are formed of Ni—Zn ferrite, for example, to assure a reduced eddy-current loss.

Figure 8:
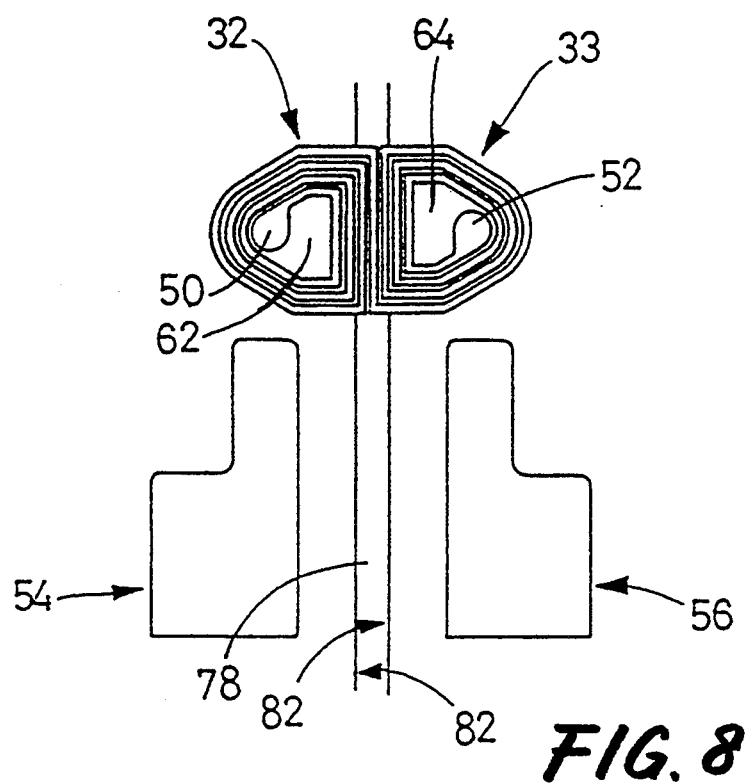
FIG. 8 is a plan view showing another step for preparing the magnetic circuit board of FIG. 2.

An electrically conductive thin film is applied to one of opposite major surfaces of the magnetic circuit board 30 by a suitable thin-film forming method, so as to form the coils 32, 33 integrally on the first and second magnetic substrates 40, 42, respectively. The coils 32, 33 cooperate with each other to constitute a continuous circuit pattern, whose opposite ends 50, 52 are located at the centers of the respective coils 32, 33, as shown in FIG. 8. The electrically conductive thin film which gives the coils 32, 33 may be formed of copper, or a copper-base alloy such as Cu—Al.

The magnetic circuit board 30 further includes a pair of leads 54, 56 formed on the first and second magnetic substrates 40, 42, respectively, and a pair of electrically conductive layers 58, 59 adapted to electrically conduct end portions 46, 48 of the leads 54, 56 with the ends 50, 52 of the coils 32, 33, respectively. With the conductive layers 58, 59, recording (writing) current or reproducing (reading) current may be applied to or retrieved from the coils 32, 33 through the leads 54, 56. In the instant embodiment, the leads 54, 56 and conductive layers 58, 59 as well as the coils 32, 33 are formed by a suitable thin-film forming method.

Between the first and second magnetic substrates 40, 42, there is provided a connector 60 for magnetically connecting these substrates 40, 42. The connector 60 is formed from a magnetic thin film by a thin-film forming method, so as to cover mutually opposed portions of the coils 32, 33. This connector 60 is fixed to the first and second magnetic substrates 40, 42 at their blanks 62, 64 located at the centers of the coils 32, 33. The connector 60 is formed of a magnetic material which can be easily formed into a thin film, preferably, a metallic magnetic material such as Ni—Fe.

It follows from the above description that the coils 32, 33 are formed in spiral configuration around the respective blanks 62, 64 at which the connector 60 is fixed to the first and second magnetic substrates 40, 42, and that the magnetic substrates 40, 42 are magnetically connected to each other by the connector 60, at these blanks 62, 64 located at the centers of the coils 32, 33.

Figure 3:
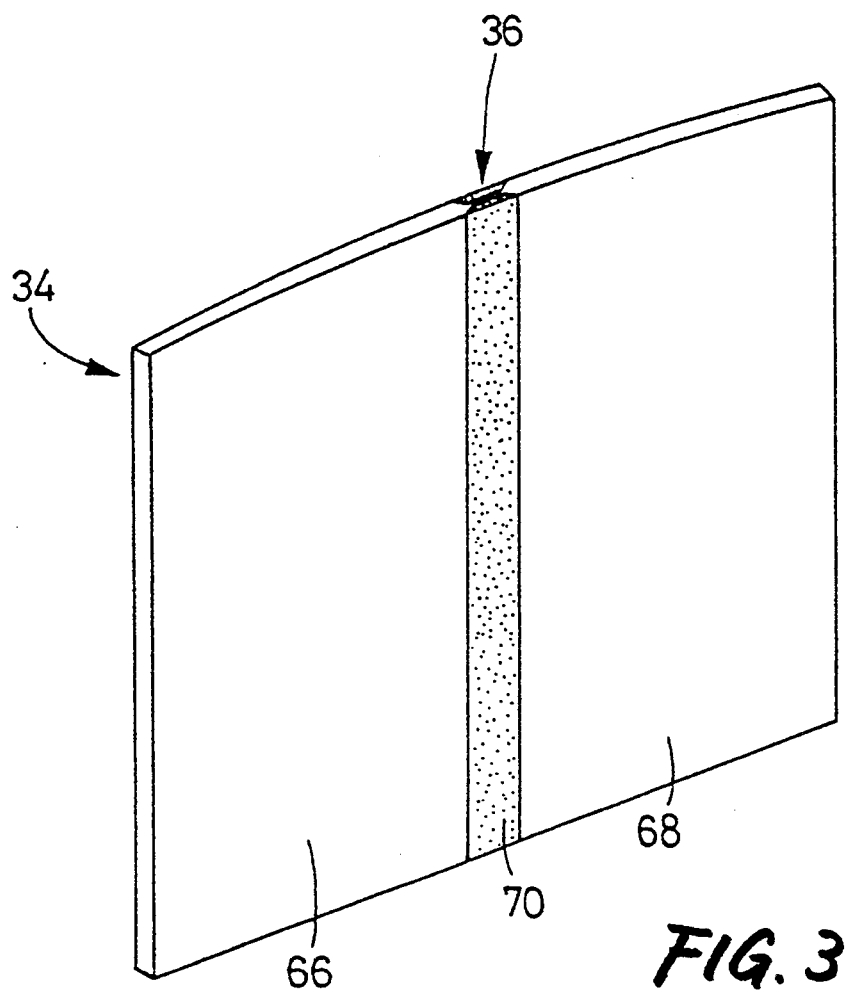
FIG. 3 is a perspective view showing a core element of the magnetic head of FIG. 1.

Referring next to FIG. 3, the core element 34 includes a third and a fourth substrate formed of a magnetic material, i.e., a third magnetic substrate 66 and a fourth magnetic substrate 68 both having a generally rectangular planar shape. The third and fourth magnetic substrates 66, 68 are butted and bonded together through a non-magnetic bonding layer 70 formed of a glass material or the like, into an integral flat plate which gives the core element 34. Like the first and second magnetic substrates 40, 42, the third and fourth magnetic substrates 66, 68 are formed of Ni—Zn ferrite or other materials which are conventionally used for head cores and have a high degree of magnetic permeability.

The above-indicated magnetic gap 36 is formed between mutually abutting surfaces of the third and fourth magnetic substrates 66, 68 of the core element 34, so that the magnetic gap 36 is adapted to face a magnetic recording medium upon operating of the magnetic head 38. Like a magnetic gap formed in the conventional magnetic head core, the magnetic gap 36 has a predetermined width as measured in the direction of thickness of the third and fourth magnetic substrates 66, 68, and a predetermined depth as measured in the longitudinal direction of the mutually facing surfaces of the magnetic substrates 66, 68. The third and fourth magnetic substrates 66, 68 are not connected to each other at a rear portion of the magnetic gap 36, and are separated a suitable distance from each other, unlike the conventional magnetic head core having an annular magnetic path.

As shown in FIG. 1, the magnetic circuit board 30 is superposed on and bonded to the core element 34 by a suitable bonding agent, such that the bonding layer 70, third magnetic substrate 66 and fourth magnetic substrate 68 are located on the bonding layer 44, first magnetic substrate 40 and second magnetic substrate 42, respectively. At the same time, the first and third magnetic substrates 40, 66 and the second and fourth magnetic substrates 42, 68 are magnetically connected to each other. Thus, an intended magnetic head 38 is obtained.

In this magnetic head 38, the first, second, third and fourth magnetic substrates 40, 42, 66, 68 cooperate with the connector 60 to form a single closed magnetic circuit which includes the magnetic gap 36. As known in the art, the closed magnetic circuit is adapted to apply a magnetic field to a suitable magnetic recording medium or detect the magnetic field generated by the recording medium, through the coils 32, 33, so as to effect the information writing and reading operation.

There will be hereinafter described one example of a manner of producing the magnetic head 38 constructed as described above.

Figure 4:
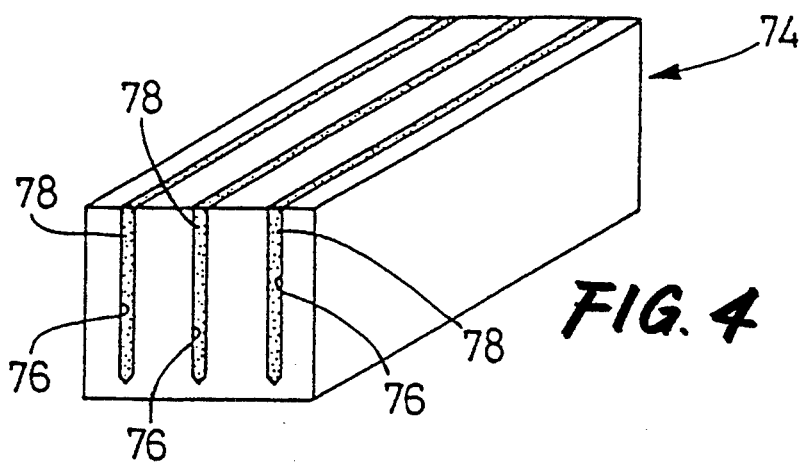
FIG. 4 is a perspective explanatory view showing a step for preparing the magnetic circuit board of FIG. 2.

In producing the magnetic head 38, the magnetic circuit board 30 as described above is first formed in the following manner. Referring to FIG. 4, a ferrite block 74 formed of Ni—Zn ferrite is prepared which gives the first and second magnetic substrates 40, 42. The ferrite block 74 is formed with a plurality of equally spaced-apart grooves 76. Then, masses of a glass material 78 are poured into the grooves 76 to fill the same.

Figure 5:
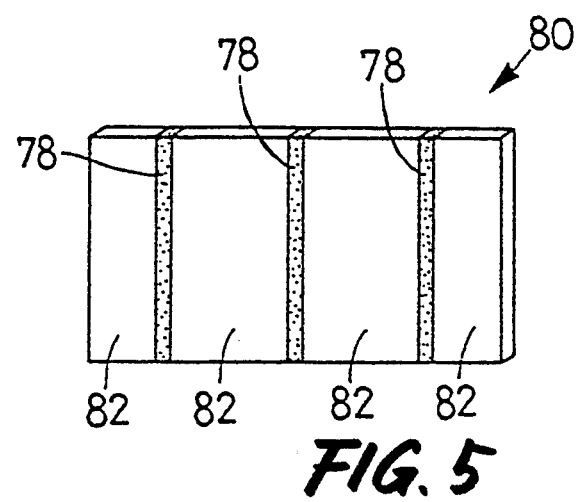
FIG. 5 is a perspective explanatory view showing another step for preparing the magnetic circuit board of FIG. 2.

Subsequently, the ferrite block 74 is cut along a line which passes the bottom portions of the grooves 76, and then cut in a direction perpendicular to the longitudinal direction of the grooves 76, into sliced sheets having a given thickness, which are then subjected to a grinding process to provide a plurality of flat plates 80, as shown in FIG. 5. Each flat plate 80 consists of a plurality of magnetic plates 82 made of Ni—Zn ferrite, which eventually form the first and second magnetic substrates 40, 42, and the masses of glass material 78 for bonding the magnetic plates 82, which eventually form the bonding layers 44 described above.

Figure 6:
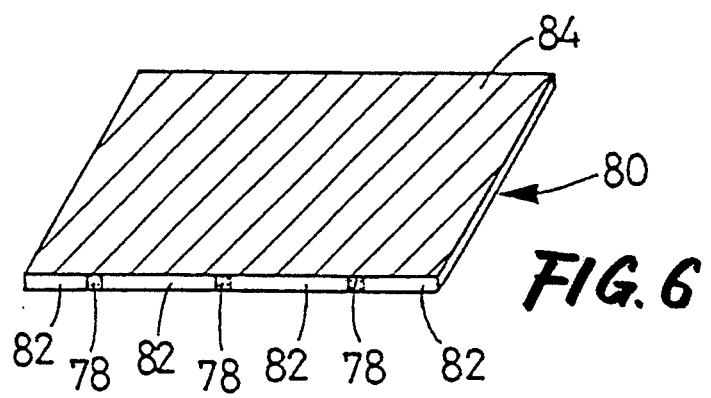
FIG. 6 is a perspective explanatory view showing a further step for preparing the magnetic circuit board of FIG. 2.

After one of opposite major surfaces of the flat plate 80 is mirror-finished, a copper film 84 having a thickness of about 0.1–0.2 $\mu$m is formed over the entire area of the mirror-finished surface of the plate 80, as shown in FIG. 6. This copper film 84 serves as a base film (electrode) used in the following electroplating process.

The thus obtained flat plate 80 is cut into a plurality of magnetic circuit boards 30 after a plurality of identical patterns including those of the coils 32, 33 and connector 60 are formed on the copper film 84. In the following description, however, the manner of producing only one of the magnetic circuit boards 30 will be described.

Figure 7:
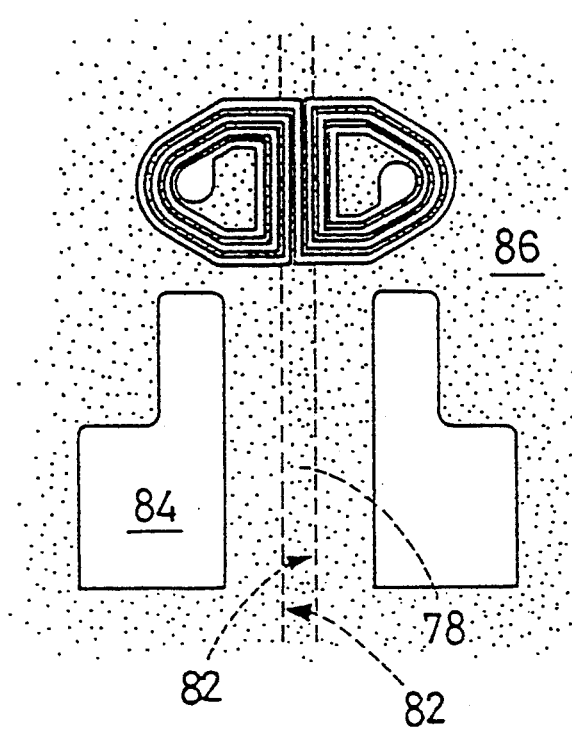
FIG. 7 is a plan view showing a step for preparing the magnetic circuit board of FIG. 2.
Figure 11:
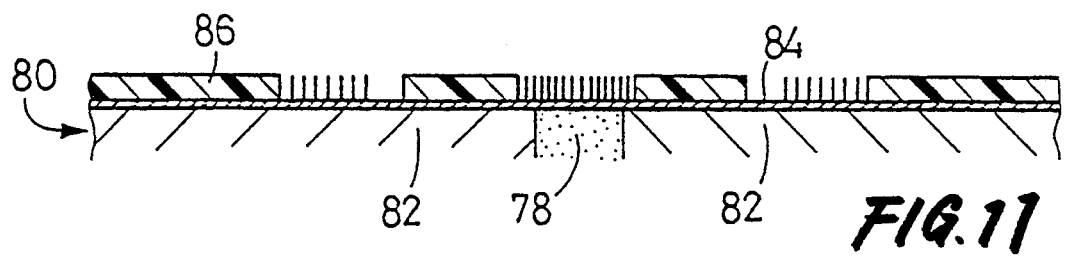
FIG. 11 is a cross sectional view showing a first step for preparing the magnetic circuit board of FIG. 2.

Initially, the coils 32, 33 and leads 54, 56 are formed on the flat plate 80 covered with the copper film 84. As shown in FIGS. 7 and 11, a photo resist 86 having a thickness of about 3.0 $\mu$m is formed by coating over the entire area of the copper film 84 on the flat plate 80, and then exposed and developed so that a pattern for the coils 32, 33 and leads 54, 56 is formed on the film 84. As a result of this photolithography process, the copper film 84 is exposed at its portions on which the coils 32, 33 and leads 54, 56 are to be formed, with the other portions of the film 84 covered with the photo resist 86. It will be understood from FIGS. 7 and 11 that the pattern for the coils 32, 33 and leads 54, 56 is formed over the two magnetic plates 82 located on the opposite sides of the glass layer 78 (bonding layer 44).

Figure 12:
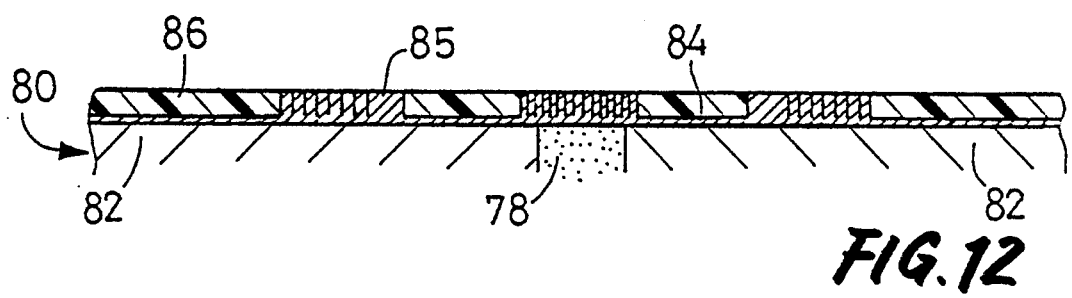
FIG. 12 is a cross sectional view showing a second step for preparing the magnetic circuit board of FIG. 2.
Figure 13:
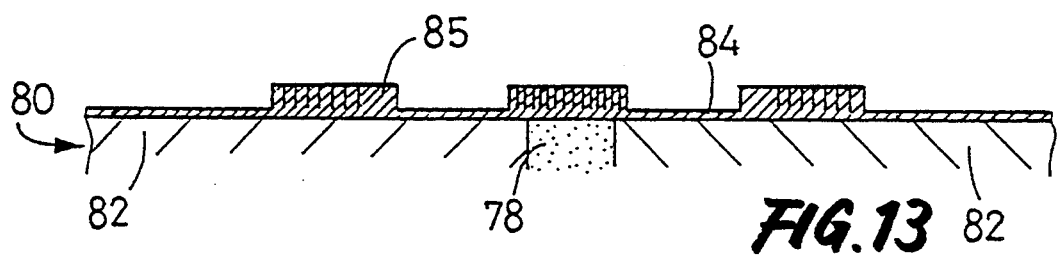
FIG. 13 is a cross sectional view showing a third step for preparing the magnetic circuit board of FIG. 2.
Figure 14:
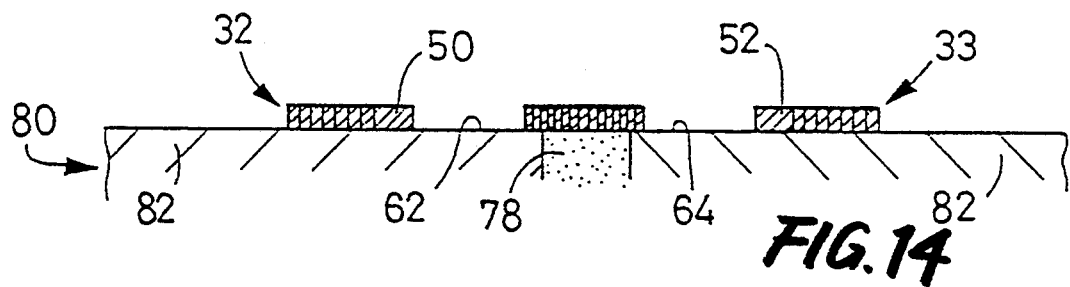
FIG. 14 is a cross sectional view showing a fourth step for preparing the magnetic circuit board of FIG. 2.

Subsequently, the flat plate 80 which carries the photo resist 86 thereon is electroplated with copper, so that a copper layer 85 having a thickness of about 2–3 $\mu$m is formed on the exposed portions of the copper film 84, as shown in FIG. 12. Then, the photo resist 86 is removed, as shown in FIG. 13, and the copper film 84 and copper layer 85 are subjected to ion-milling or ion-etching and thus etched by an amount corresponding to the thickness of the copper film 84. Consequently, the coils 32, 33 and leads 54, 56 are formed on the magnetic plates 82, 82 on the opposite sides of the glass layer 78, as shown in FIGS. 8 and 14.

Figure 9:
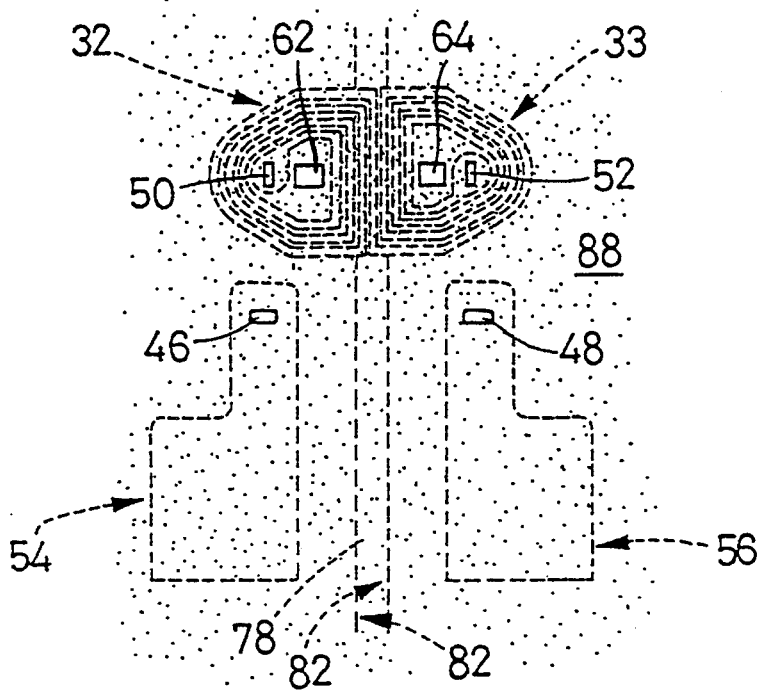
FIG. 9 is a plan view showing a further step for preparing the magnetic circuit board of FIG. 2.
Figure 15:
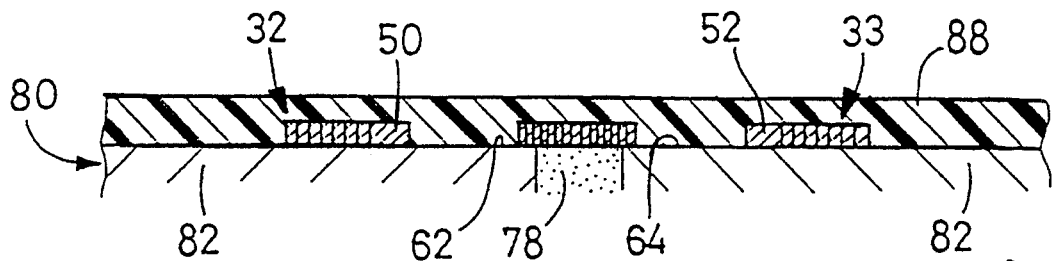
FIG. 15 is a cross sectional view showing a fifth step for preparing the magnetic circuit board of FIG. 2.
Figure 16:
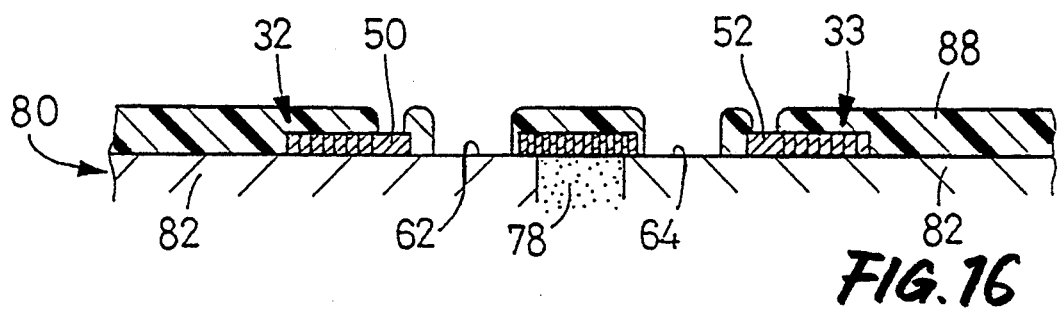
FIG. 16 is a cross sectional view showing a sixth step for preparing the magnetic circuit board of FIG. 2.

After the formation of the coils 32, 33 and leads 54, 56, the electrically conductive layers 58, 59 and connector 60 are then formed on the flat plate 80. Referring first to FIGS. 9, 15 and 16, a photo resist 88 having a thickness of about 2.0 $\mu$m is formed by coating over the entire surface area of the flat plate 80, and then exposed and developed so that the ends 50, 52 of the coils 32, 33 and the ends 46, 48 of the leads 54, 56 are exposed while 10 the magnetic plates 82 are exposed at their portions (blanks 62, 64) located at the centers of the coils 32, 33. As a result of this photolithography process, the coils 32, 33, leads 54, 56 and magnetic plates 82, 82 are exposed only at the ends 50, 52, 46, 48 and blanks 62, 64 to which the conductive layers 58, 59 and connector 60 are to be connected or fixed, with the other portions covered with an insulating layer which consists of the photo resist 88.

Figure 17:
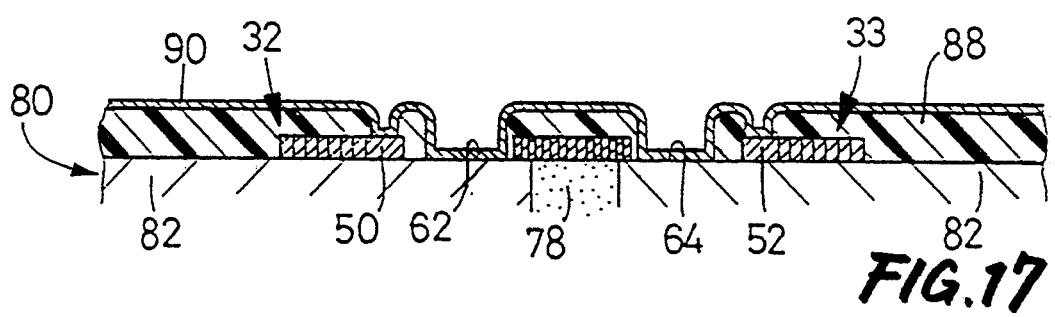
FIG. 17 is a cross sectional view showing a seventh step for preparing the magnetic circuit board of FIG. 2.

Subsequently, a Ni—Fe magnetic film 90 is applied by sputtering to the surface of the flat plate 80 which carries the photo resist 88, as shown in FIG. 17, so that the magnetic film 90 of about 0.1–0.2 μm in thickness is formed over the entire area of the relevant surface of the plate 80 so as to provide a base film (electrode) used in the following electroplating process.

Figure 10:
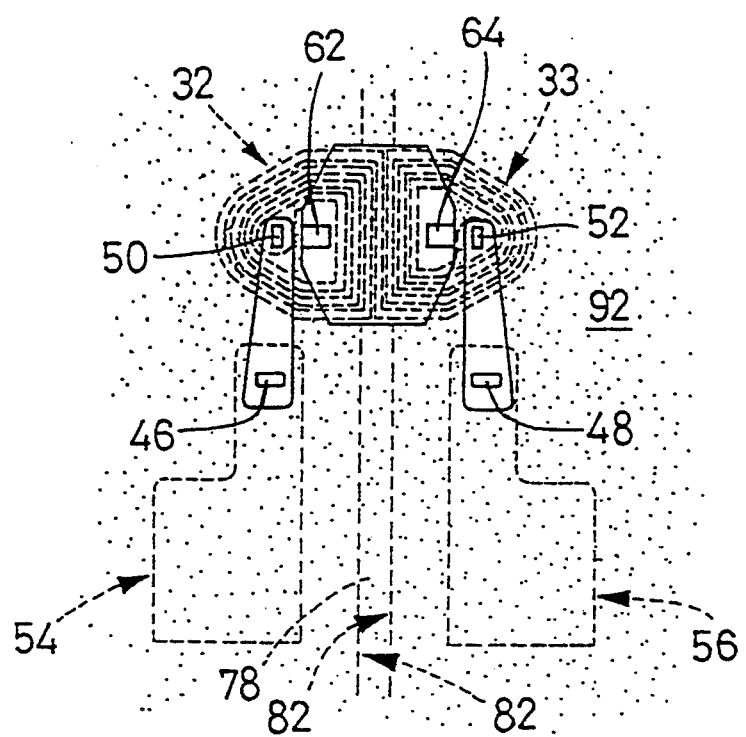
FIG. 10 is a plan view showing a still further step for preparing the magnetic circuit board of FIG. 2.
Figure 18:
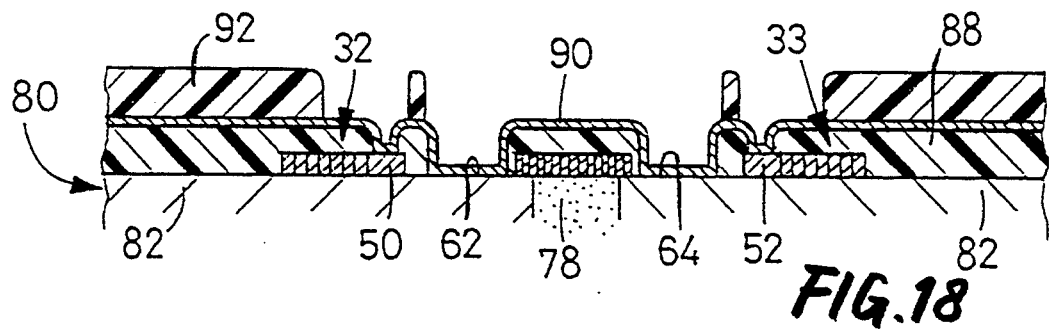
FIG. 18 is a cross sectional view showing an eighth step for preparing the magnetic circuit board of FIG. 2.

As shown in FIGS. 10 and 18, a photo resist 92 having a thickness of about 3.0 μm is formed by coating over the entire area of the magnetic film 90 on the flat plate 80, and then exposed and developed so that a pattern for the conductive layers 58, 59 and connector 60 is formed on the film 90. As a result of this photolithography process, the magnetic film 90 is exposed only at its portions where the conductive layers 58, 59 and connector 60 are to be formed, with the other portions covered with the photo resist 92.

Figure 19:
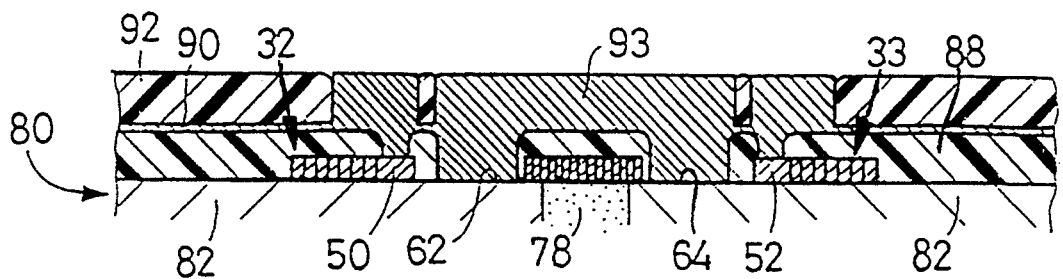
FIG. 19 is a cross sectional view showing a ninth step for preparing the magnetic circuit board of FIG. 2.
Figure 20:
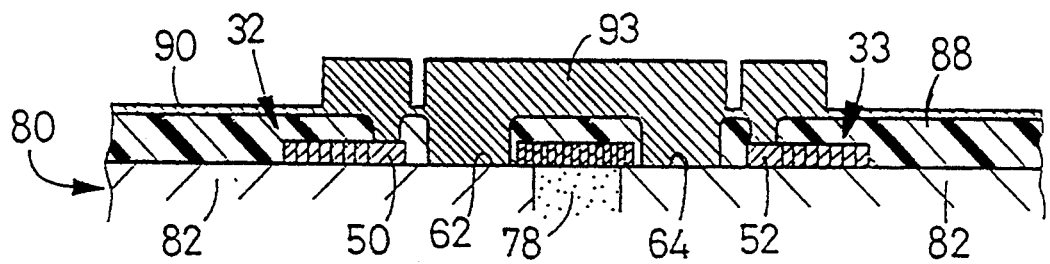
FIG. 20 is a cross sectional view showing a tenth step for preparing the magnetic circuit board of FIG. 2.
Figure 21:
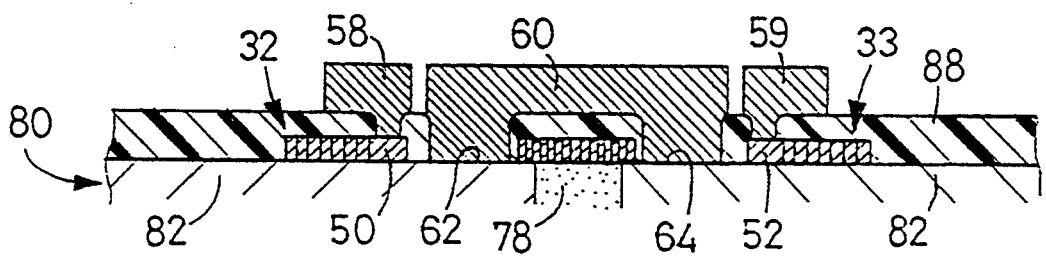
FIG. 21 is a cross sectional view showing an eleventh step for preparing the magnetic circuit board of FIG. 2.

Thereafter, the flat plate 80 carrying the photo resist 92 is electroplated with a Ni—Fe magnetic material, so that a magnetic layer 93 of about b 3.0 1 82 m in thickness is formed on the exposed portions of the magnetic film 90, as shown in FIG. 19. Then, the photo resist 92 is removed, as shown in FIG. 20, and the magnetic film 90 and magnetic layer 93 are subjected to ion-milling and thus etched by an amount corresponding to the thickness of the magnetic film 90. Consequently, the conductive layers 58, 59 and connector 60 are formed on the flat plate 80, as shown in FIG. 21.

Figure 2:
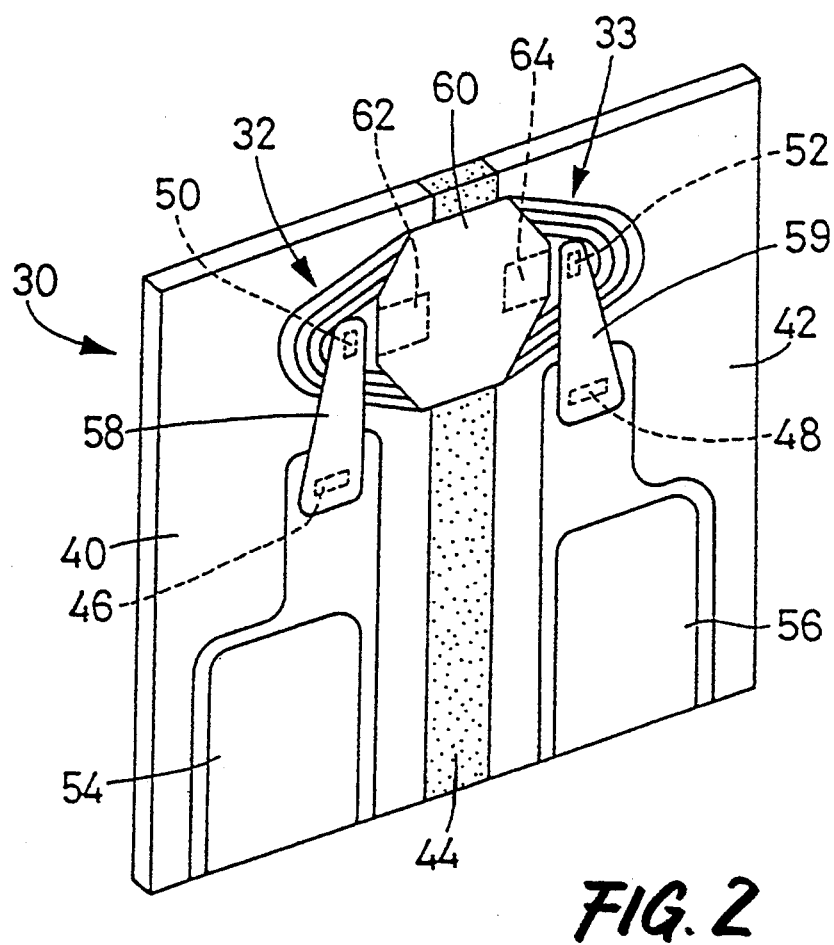
FIG. 2 is a perspective view showing a magnetic circuit board of the magnetic head of FIG. 1.
Figure 22:
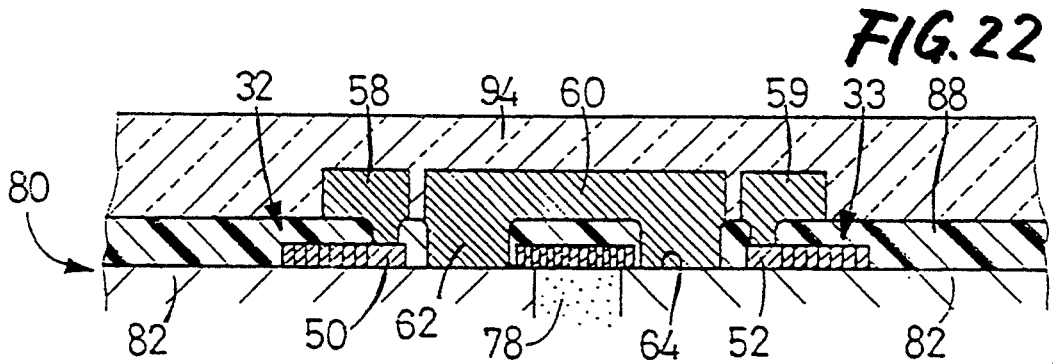
FIG. 22 is a cross sectional view showing a twelfth step for preparing the magnetic circuit board of FIG. 2.
Figure 23:
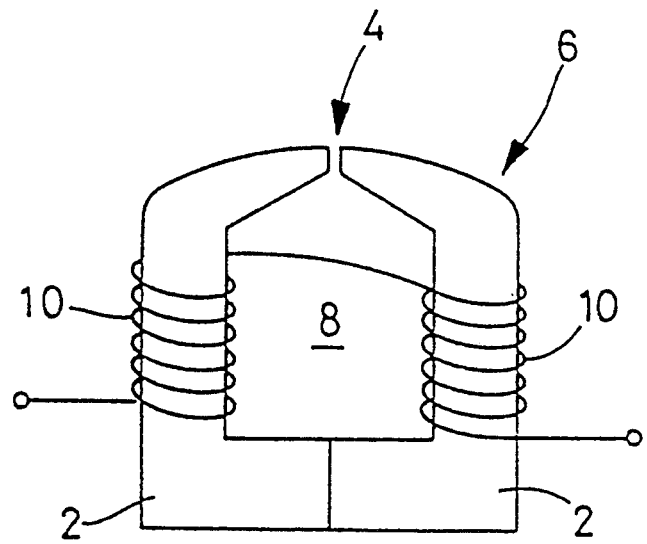
FIG. 23 is a view illustrating the conventional bulk-type magnetic head.
Figure 24:
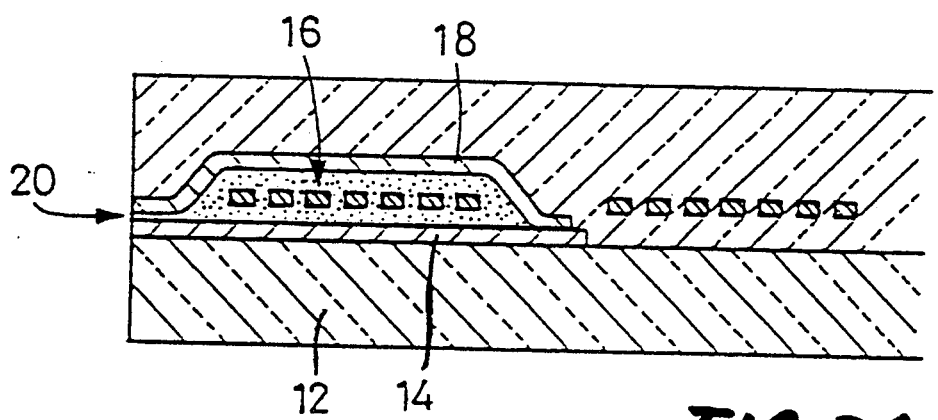
FIG. 24 is a cross sectional view showing the conventional thin-film type magnetic head.

After the formation of the conductive layers 58, 59 and connector 60, an insulating protective film 94 made of $SiO_2$ or $Al_2O$, for example, is formed as needed by sputtering or other process, so as to cover the entire surface area of the flat plate 80, as shown in FIG. 22. Thereafter, the protective film 94 is removed by photo-etching only at its portions formed on the leads 54, 56. In this manner, the intended magnetic circuit board 30 as illustrated in FIG. 2 is obtained.

Apart from the formation of the magnetic circuit board 30, another process is effected for forming the core element 34 as illustrated in FIG. 3. According to a method of producing the conventional bulk-type magnetic head core, the core element 34 is produced by: preparing two blocks formed of a magnetic material such as Ni—Zn ferrite, which give the third and fourth magnetic substrates 66, 68; forming grooves for defining magnetic gaps in these two blocks; bonding the blocks together by means of glass; and cutting the bonded blocks into sliced sheets having a given thickness, for example.

The thus obtained magnetic circuit board 30 and core element 34 are assembled together by using a suitable adhesive, or clamped by a suitable clamping member, whereby the magnetic head 38 as illustrated in FIG. 1 is obtained.

In the thus constructed magnetic head 38, the coils 32, 33 are formed integrally on the first and second magnetic substrates 40, 42 by a thin-film forming method, without requiring a manual procedure of winding coils for producing the conventional bulk-type magnetic head. Thus, the present magnetic head can be manufactured with high efficiency and high productivity, assuring a high degree of quality stability and a significantly reduced number of defective heads.

In the instant magnetic head 38, the magnetic circuit is constituted by the first and second magnetic substrates 40, 42 of the magnetic circuit board 30, and the third and fourth magnetic substrates 66, 68 of the core element 34. Accordingly, the magnetic circuit exhibits a sufficiently reduced magnetic resistance, compared to the conventional thin-film type magnetic head, assuring excellent operating efficiency of the magnetic head.

In addition, the magnetic circuit is formed in the magnetic head 38 in the direction of thickness of the head 38. When the coils 32, 33 are located in the vicinity of the magnetic gap 36 as in the instant embodiment, therefore, the length of the magnetic path of the magnetic circuit can be effectively reduced, resulting in further improved operating efficiency of the magnetic head.

In the instant embodiment, the core element 34 having the magnetic gap 36 is formed separately from the magnetic circuit board 30. That is, the process of forming the magnetic gap is independent of the process of forming the coils and others. Thus, the magnetic gap and coils can be formed with further improved efficiency and productivity.

Further, the magnetic head 38 of the instant embodiment exhibits excellent electro-magnetic conversion characteristics, since the coils 32, 33 are respectively formed on the first and second magnetic substrates 40, 42.

In the magnetic head 38 of the instant embodiment, the first and second magnetic substrates 40, 42 of the magnetic circuit board 30 are formed of Ni—Zn ferrite having no electrical conductivity. Accordingly, there is no need to provide an insulating material between the substrates 40, 42 and the coils 32, 33. Thus, the present magnetic head 38 may be produced in simple construction with high efficiency.

While the present invention has been described in its preferred embodiment, for illustrative purpose only, the invention may be otherwise embodied.

In the illustrated embodiment, the magnetic circuit board 30 with the coils 32, 33 is formed separately from the core element 34 with the magnetic gap 36. However, a magnetic gap may be formed between the first and second magnetic substrates 40, 42 of the magnetic circuit board 30, to provide an integrally formed magnetic head.

While the coils 32, 33 are formed on the first and second magnetic substrates 40, 42, respectively, in the illustrated embodiment, a coil may be formed on one of the two magnetic substrates.

Further, the shape of the coils or the manner of winding the coils is not limited to that of the illustrated embodiment, but may be changed as desired by employing a multilayer film forming technique or the like. For example, the coil may be formed in multilayer spiral configuration.

The materials of the magnetic substrates 40, 42, 66, 68 of the magnetic circuit, coils 32, 34, leads 54, 56, conductive layers 58, 59, connector 60, insulating layer and others, and the manner of forming these components are not limited to those of the illustrated embodiment. For example, the coils 32, 33 and the magnetic film 90 may be formed by sputtering, for example, instead of electroplating. Further, the magnetic film 90 may be favorably formed of Sendust composed of Fe, Si and Al, an amorphous alloy (metal-metal) composed of Co, Zr and Nb, for example, or a metallic alloy (metal-metalloid) composed of Fe, Co, Si and B, for example, other than Permalloy composed of Ni and Fe as used in the illustrated embodiment.

Moreover, the connector 60 may be formed of a non-conductive magnetic material. In this case, the conductive layers 58, 59 are formed of a suitable conductive material, separately from the connector 60.

It is also to be understood that the present invention may be embodied with various other changes, modifications and improvements, which may occur to those skilled in the art, without departing from the spirit and scope of the invention defined in the appended claims.

What is claimed is:

1. A thin-film magnetic circuit board comprising:

first and second planar substrates each comprising a magnetic material;

a non-magnetic layer interposed between the entirety of side surfaces of said first and second planar substrates, for bonding said first and second planar substrates to each other in juxtaposition such that said substrates are arranged in the same plane;

a pair of coils formed on each of said first and second planar substrates, respectively, said coils being formed from an electrically conductive film to provide a circuit pattern on said first and second planar substrates, each coil having a spiral shape and surrounding a predetermined blank portion formed on a surface of each of said first and second planar substrates;

a pair of leads which are electrically connected to opposite ends of said circuit pattern formed by said coils, said pair of leads being formed on said first and second planar substrates, respectively; and a connector formed of a magnetic film, for magnetically connecting said first and second planar substrates, said connector extending between said first and second planar substrates such that the connector is fixed to said predetermined blank portion of said first and second planar substrates.

2. A thin-film magnetic circuit board according to claim 1, wherein said pair of coils have respective ends as said opposite ends of said circuit pattern, each of which is located in said predetermined blank portion of the corresponding one of said first and second planar substrates.

3. A thin-film magnetic circuit board according to claim 2, further comprising a pair of electrically conductive layers formed on said first and second planar substrates, respectively, for electrically connecting said ends of said coils to corresponding end portions of said pair of leads.

4. A thin-film magnetic circuit board according to claim 1, wherein said first and second planar substrates comprise Ni—Zn ferrite.

5. A thin-film magnetic circuit board according to claim 1, wherein said non-magnetic layer comprises a glass material.

6. A thin-film magnetic circuit board according to claim 1, wherein said connector comprises a metallic magnetic material composed of Ni and Fe.

7. A magnetic head including a thin-film magnetic circuit board as defined in claim 1, wherein a magnetic gap is formed between said side surfaces of said first and second planar substrates, said first and second planar substrates cooperating with said connector to provide a single closed magnetic circuit including said magnetic gap.

8. A magnetic head including a thin-film magnetic circuit board as defined in claim 1, and a head core element comprising: a third and a fourth substrate formed of a magnetic material; a non-magnetic layer interposed between the entirety of side surfaces of said third and fourth substrates, for bonding said third and fourth substrates to each other, said non-magnetic layer partially defining a magnetic gap which is formed between said mutually abutting surfaces of said third and fourth substrates; said magnetic circuit board having a first major surface on which said connector is formed and an opposed second major surface, said head core element being superposed on said second major surface of said thin-film magnetic circuit board, so that said third and fourth substrates are magnetically connected to said first and second substrates, respectively, said first, second, third and fourth substrates cooperating with said connector to provide a single closed magnetic circuit including said magnetic gap.

9. A magnetic head according to claim 8, wherein said magnetic gap extends in a direction perpendicular to a plane of said planar substrates.

10. A thin-film magnetic circuit board according to claim 1, wherein said pair of coils comprise one of copper and a copper alloy including Cu—Al.

* * * * *